(12) United States Patent
Jeffers et al.

(10) Patent No.: US 7,355,684 B2
(45) Date of Patent: Apr. 8, 2008

(54) INTERFEROMETRIC SIGNAL CONDITIONER FOR MEASUREMENT OF THE ABSOLUTE LENGTH OF GAPS IN A FIBER OPTIC FABRY-PEROT INTERFEROMETER

(75) Inventors: Larry A. Jeffers, Minerva, OH (US); John W. Berthold, Salem, OH (US); Richard L. Lopushansky, The Woodlands, TX (US)

(73) Assignee: Davidson Instruments, Inc., The Woodlands, TX (US)

( * ) Notice: Subject to any disclaimer, the term of this patent is extended or adjusted under 35 U.S.C. 154(b) by 135 days.

(21) Appl. No.: 11/106,750

(22) Filed: Apr. 15, 2005

(65) Prior Publication Data

US 2005/0231730 A1 Oct. 20, 2005

Related U.S. Application Data

(60) Provisional application No. 60/562,492, filed on Apr. 15, 2004, provisional application No. 60/562,682, filed on Apr. 15, 2004.

(51) Int. Cl.
*G01L 1/24* (2006.01)

(52) U.S. Cl. ..................... 356/35.5; 356/480

(58) Field of Classification Search ............... 356/480, 356/454, 519, 506, 505
See application file for complete search history.

(56) References Cited

U.S. PATENT DOCUMENTS

| 4,572,669 | A | 2/1986 | James et al. |
| 4,628,211 | A | 12/1986 | Ruppert |
| 4,640,616 | A | 2/1987 | Michalik |
| 4,678,909 | A | 7/1987 | Jackson et al. |
| 4,755,668 | A | 7/1988 | Davis et al. |
| 4,873,989 | A | 10/1989 | Einzig et al. |
| 4,907,035 | A | 3/1990 | Galburt et al. |
| 5,177,805 | A | 1/1993 | Groger et al. |
| 5,202,939 | A | 4/1993 | Belleville et al. |
| 5,392,117 | A | 2/1995 | Belleville et al. |
| 5,477,323 | A | 12/1995 | Andrews et al. |
| 5,526,114 | A | 6/1996 | Eselun |
| 5,550,373 | A * | 8/1996 | Cole et al. ............... 250/338.1 |
| 5,760,391 | A | 6/1998 | Narendran |
| 5,784,507 | A | 7/1998 | Holm-Kennedy et al. |

(Continued)

FOREIGN PATENT DOCUMENTS

EP 0957345 11/1999

*Primary Examiner*—Tarifur Chowdhury
*Assistant Examiner*—Jonathan M Hansen
(74) *Attorney, Agent, or Firm*—McDonald Hopkins, LLC; Risto Pribisich

(57) ABSTRACT

A method and apparatus for quantitatively measuring the distance of an unknown variable gap is disclosed. Light is provided to two Fabry-Perot interferometers arranged in a series, one spanning the unknown gap and the other spanning a controllably variable gap. Means for verifying the positioning of the Fabry-Perot interferometer having the controllably variable gap work in conjunction with a signal processor, a correlation burst signal detector and means for conveying the light to the various system elements to perform a comparison of detector signals from the two interferometers and quantitatively establish the gap distance. The invention may also be varied to function on a time basis, include more than one source of light, possess filter means to distinguish between light sources and/or include one or more reference interferometers.

29 Claims, 10 Drawing Sheets

U.S. PATENT DOCUMENTS

| | | |
|---|---|---|
| 5,852,498 A | 12/1998 | Youvan et al. |
| 5,872,628 A | 2/1999 | Erskine |
| 6,057,911 A * | 5/2000 | Reich ................... 356/35.5 |
| 6,075,613 A | 6/2000 | Schermer et al. |
| 6,157,025 A | 12/2000 | Katagiri et al. |
| 6,173,091 B1 | 1/2001 | Reich |
| 6,233,262 B1 | 5/2001 | Mesh et al. |
| 6,282,215 B1 | 8/2001 | Zorabedian et al. |
| 6,289,143 B1 | 9/2001 | Berthold et al. |
| 6,486,984 B1 | 11/2002 | Baney et al. |
| 6,490,038 B1 | 12/2002 | Jung et al. |
| 6,545,760 B1 | 4/2003 | Froggatt et al. |
| 6,603,560 B1 * | 8/2003 | Islam ..................... 356/480 |
| 6,687,011 B1 * | 2/2004 | Lee et al. ................ 356/480 |
| 6,947,218 B2 * | 9/2005 | Turner, III .............. 359/589 |
| 6,989,906 B2 * | 1/2006 | Sandercock ............. 356/519 |
| 2002/0015155 A1 | 2/2002 | Pechstedt et al. |
| 2002/0071626 A1 | 6/2002 | Davis et al. |
| 2002/0081073 A1 | 6/2002 | Lee et al. |
| 2002/0191294 A1 | 12/2002 | Duggan |
| 2003/0007522 A1 | 1/2003 | Li et al. |
| 2003/0012230 A1 | 1/2003 | Hopkins et al. |
| 2003/0021303 A1 | 1/2003 | Daiber |
| 2003/0039428 A1 * | 2/2003 | Okamoto et al. ............ 385/12 |
| 2003/0066953 A1 | 4/2003 | Kwon |
| 2003/0076505 A1 | 4/2003 | Bao et al. |
| 2003/0128917 A1 | 7/2003 | Turpin et al. |
| 2003/0141440 A1 | 7/2003 | Kim et al. |
| 2003/0142702 A1 | 7/2003 | Pontis et al. |
| 2003/0147067 A1 | 8/2003 | Woodside et al. |
| 2003/0161360 A1 | 8/2003 | Johnson |
| 2003/0231844 A1 | 12/2003 | Kersey et al. |
| 2004/0071383 A1 | 4/2004 | Balachandran et al. |

* cited by examiner

INTERFEROMETRIC SIGNAL CONDITIONER FOR MEASUREMENT OF THE ABSOLUTE LENGTH OF GAPS IN A FIBER OPTIC FABRY-PEROT INTERFEROMETER

The present invention relates to fiber optic Fabry-Perot interferometers and more particularly to a method and apparatus for quantitatively measuring the absolute length of a static gap in a Fabry-Perot interferometer. This application claims the benefit of application Ser. Nos. 60/562,492 and 60/562,682, both filed on Apr. 15, 2004.

BACKGROUND AND FIELD OF INVENTION

Fabry-Perot sensors have broad utility for applications where the measurement of the absolute length of an interferometric gap in a Fabry-Perot sensor. These gaps may relate to pressure, temperature, strain or some other physical property of the material which bounds one side of the gap. For example, their simplicity of design allows these sensors to be embedded into large industrial applications including gas turbines, pressure vessels, pipelines, buildings, or other structures, in order to provide information about pressure, temperature, strain, vibration, or acceleration within the structure. Their size, durability and fast response time make these sensors advantageous.

In operation, Fabry-Perot interferometers are capable of spanning a range of gaps to create an interference pattern, regardless of whether via reflected light or transmitted light. Performing an optical cross-correlation of such an interference pattern, by reflecting or transmitting the interference pattern through a second interferometer, produces a distinctive signal that reaches a peak intensity of light when the length of the gap in the optical cross-correlator matches the length of the gap in the Fabry-Perot sensor. This distinctive peak intensity signal forms the basis for measurement of the absolute length of a gap in the Fabry-Perot sensor. Although previous systems known to the inventors use optical cross-correlators to make measurements of the length of gaps in Fabry-Perot sensors, the invention described herein is capable of making quantitative, absolute measurements with better sensitivity, greater dynamic range, greater frequency response, and lower cost than previously known systems.

SUMMARY OF INVENTION

The invention, at its most basic level, consists of one or more light sources, a first Fabry-Perot sensor spanning a gap which varies in response to changes in the environment (pressure, temperature, strain, etc.) and a second sensor having means for optically cross-correlating modulated light that is reflected by or transmitted through the first Fabry-Perot sensor. This second sensor includes means of controllably varying the length of the gap in the second sensor. A correlation burst signal detector is used, and means for verifying the gap distance of the second sensor are required. Lastly, means for comparing correlation burst signals from the first and second sensor in order to determine the absolute distance of the variable gap in the sensor are also included. Additional light sources may be provided, and the means for verifying the gap distance of the second sensor may comprise a set of known, fixed distance sensors which represent upper and lower limits for the sensitivity of the overall system.

The light sources may consist of a broadband light emitting diode (LED), edge light emitting diode (ELED), super luminescent diodes (SLEDs), wideband lasers such as a vertical cavity surface emitting laser (VCSEL), narrow band lasers such as a HeNe, or various tungsten lamps.

The means for optical cross-correlation of the modulated light reflected by or transmitted from the Fabry-Perot interferometric sensor preferably comes in the form of an optical cross-correlator placed in series with the Fabry-Perot sensor. As used throughout, the term optical cross-correlator should be understood to mean a system element having a variable gap where the gap is bounded on either side by partial reflectors. Preferably, the reflectivity of these boundary surfaces is between 20% and 50%. This optical cross-correlator is preferably configured as a Fabry-Perot interferometer. The amplitude or percentage of light reflected from or transmitted through the Fabry-Perot sensor and reflected from or transmitted through the optical cross-correlator is defined by the cross correlation product of the classic interferometric equation for each interferometer. For further discussion of such modulation, including the various equations that may be used to perform the calculations contemplated by this invention, refer to *Principles of Optics*, Chapter 7, Born and Wolf which is hereby incorporated by reference. This classic interferometric equation defines the intensity of light as a function of both the length of the gap in the interferometer and the spectral distribution of the light that is transmitted from the light source(s).

The length of the gap in the optical cross-correlator may be variable by oscillating or moving one or both of the reflectors in the Fabry-Perot optical cross-correlator via a lead-zirconate-titanate (PZT) or some other linear or rotary actuator. The means for controlling the position of the optical cross-correlators can be accomplished with any linear or rotary positioner such as stepper motors, PZTs, magnetostrictive actuators, lever arms or any combination thereof.

The resultant correlation may be detected by one or more detectors. The detectors may consist of silicon or InGaAs photodiodes. The detectors may view different light sources with different wavelength bands. The detectors convert the light signals into an electronic output, and an electronic processor converts the electronic signals into representative measures of the Fabry-Perot sensor gap which correspond to the pressure, temperature, strain, vibration, or acceleration of interest. The electronic signals from the detectors are also used to control the frequency and amplitude of the oscillations and/or the length of the gap in the optical cross-correlator.

Finally, the invention contemplates the processing of the electronic signals from a microprocessor where software is used to read the electronic signal, control the position of the optical cross-correlators, and generate an output signal indicative of the length of the gap in the Fabry-Perot sensor.

One embodiment of the present invention relies upon an optical cross-correlator configured as a Fabry-Perot interferometer with a variable length of gap to make absolute measurements of the length of a gap in a Fabry-Perot sensor at relatively high frequency and at with a higher dynamic range than can be accomplished via other means. In this embodiment, the variable gap optical cross-correlator does not oscillate but is moved via a PZT or similar device through a range of gaps until the length of its gap matches that of the Fabry-Perot sensor. Then the system tracks changes in the length of the gap in the Fabry-Perot sensor by dithering, (oscillating through a very small range of motion). By measuring or otherwise knowing the precise length of gap in the optical cross-correlator where the length of the Fabry-Perot gap is identical to the length of the gap in the optical cross-correlator, one also knows the precise length of the gap in the Fabry-Perot sensor.

In an alternate embodiment, the variable gap optical cross-correlator is configured as a Fabry-Perot interferometer using a PZT element that oscillates at a high rate to sweep through a range of gaps at high frequency. Twice in each oscillation or sweep cycle, the length of the gap in the optical cross-correlator precisely matches the length of the gap in the Fabry-Perot sensor and at these moments a peak in the correlation signal is produced. By precisely knowing or mesuring the time of the occurrence of each match and by knowing the amplitude and frequency characteristics of the oscillations of the optical cross-correlators, one also knows the precise length of the gap in the Fabry-Perot sensor.

The amplitude and frequency of the oscillations and the precise length of the gap in the optical cross correlator can be controlled and known by applying a known voltage to a PZT element. Further embodiments contemplate the use of one or two reference sensors spanning fixed, known gaps along with two or more light sources to increase the accuracy of the system.

In operation, the inventive system comprises a light source, a first Fabry-Perot sensor capable of spanning a range of gaps, an optical cross-correlator configured as a second Fabry-Perot interferometer spanning a gap of a known length and capable of changing the length of that gap in a controllable and known manner, detector means to convert the light signals into electronic signals, and the electronic means to control the length of the gap in the optical cross-correlators and to generate an output signal indicative of the parameter to be measured.

BRIEF DESCRIPTION OF THE DRAWINGS

FIG. 6d shows output signals from detectors D1, D2, D3 that illustrate light intensity versus gap for in FIG. 6a.

DESCRIPTION OF PREFERRED EMBODIMENTS

Figure 1A:
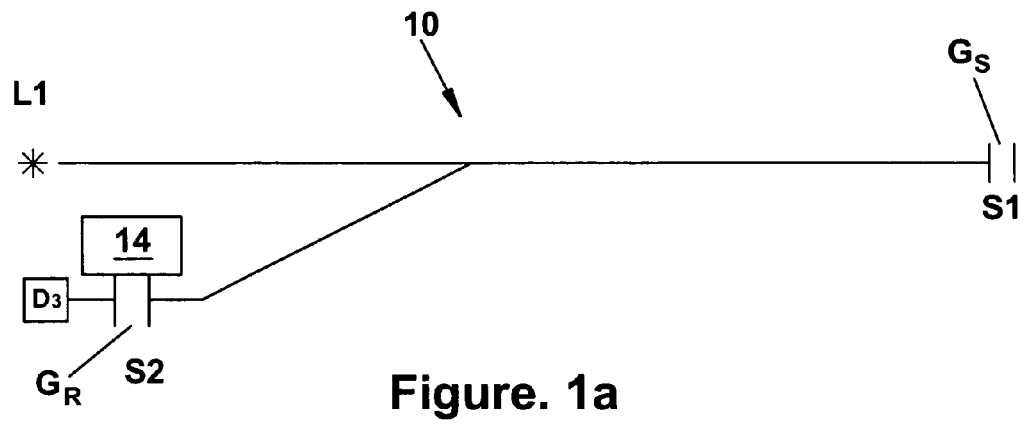
FIG. 1a is a schematic of the invention using a transmissive optical cross-correlator.

A first embodiment of the inventive system 10 is shown in FIG. 1a. Light $I_o$ generated by source L1 is modulated and reflected from the Fabry-Perot interferometer S1, which has an unknown variable gap length of $G_s$, to a Fabry-Perot interferometer S2 with a controllably variable gap $G_R$ that is mounted on a PZT element 14. Voltage is applied to PZT element 14 to induce a stretching motion on the Fabry-Perot interferometer S2 which causes a change in the length of the gap (separation of the parallel Fabry-Perot mirrors), thereby optically cross-correlating the light received by S2. The optically cross-correlated light is sensed by detector D. The controllably variable gap can be manipulated so that $G_R$ matches the length of the gap $G_s$. S1 may be a temperature, pressure, strain, vibration, acceleration, or other similar sensor. The voltage necessary to drive PZT 14 to the position where the length of the gap $G_R$ matches the length of the gap $G_s$ is directly proportional to the length of the gap $G_s$ so that the drive voltage can be directly related to the measure of the output. Notably, detector D converts the optical signal into an electronic signal and is used to determine when the match in the length of these gaps has occurred. As described in more detail below, a positional verification device (not pictured) is associated with the S2 to confirm the precise positioning of S2 so as to provide an absolute readout for the system.

Figure 2A:
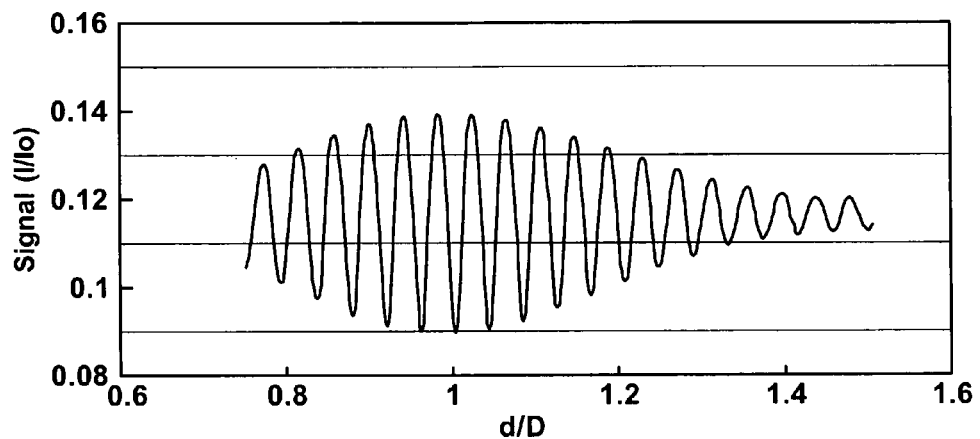
FIG. 2a shows a typical output curve for a fixed sensor gap where the length of the optical cross-correlator gap varies when a narrowband light source such as an ELED is used according to the invention.
Figure 2B:
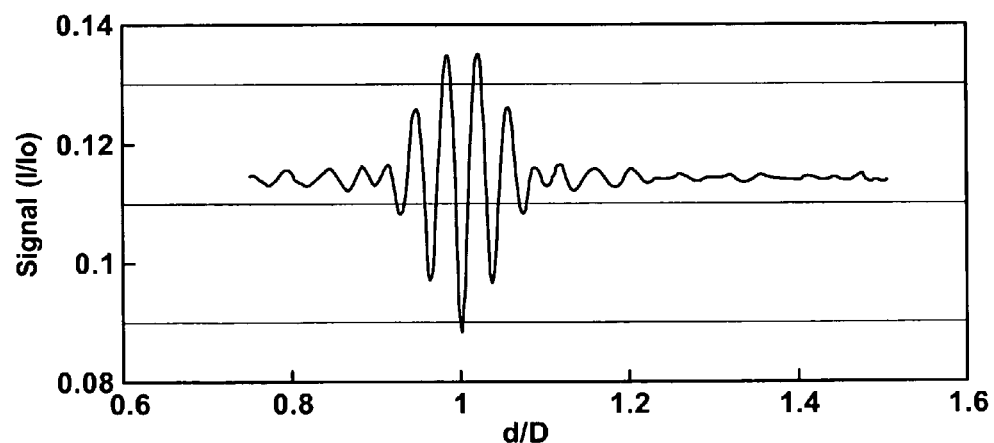
FIG. 2b shows a typical output for a fixed sensor gap where the length of the optical cross-correlator gap varies when a wide bandwidth spectral source is used according to the invention.

For a Fabry-Perot sensor with a fixed length of gap, the intensity of the light will vary as a function of the length of the gap in the optical cross-correlator as shown in FIGS. 2a and 2b where the length of the gap in the Fabry-Perot sensor is 20 um and the length of the gap in the optical cross-correlator ranges from 15 um to 25 um. The plot in FIG. 2a further assumes the light source is a light emitting diode (LED) with a center wavelength of 850 nm and spectral bandwidth of 50 nm. The plot in FIG. 2b assumes the light source is a tungsten lamp with a center wavelength of 850 nm and an effective spectral bandwidth of 400 nm considering a silicon photodetector. In both FIGS. 2a and 2b, the interferometers are made using low finesse reflectors, i.e. approximately 30% reflectors.

Figure 1B:
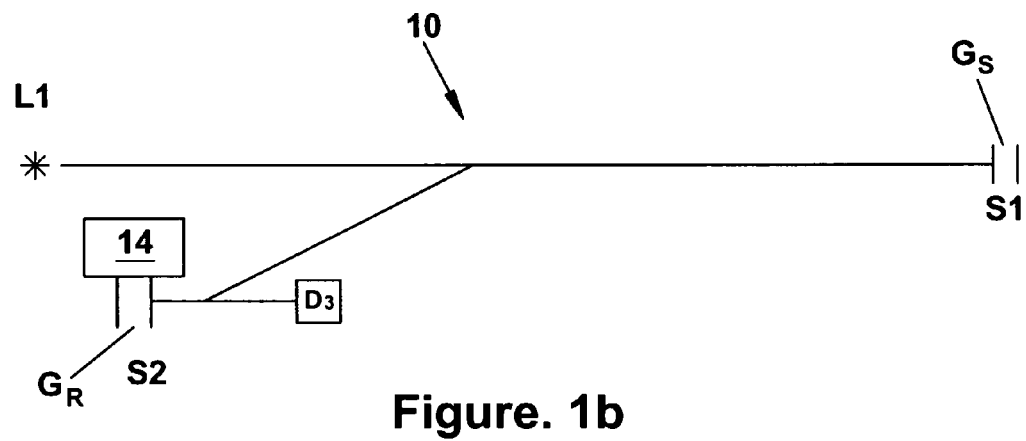
FIG. 1b shows an alternative embodiment for the optical cross-correlator which uses a reflective optical cross-correlator.

A second embodiment of the inventive system 10 is shown in FIG. 1b. Light reflected from the S1 is sent to the detector D after being reflected from an optical cross-correlator configured as a Fabry-Perot interferometer S2. This optical cross-correlator is configured by placing an optical fiber with a 30% reflective coating perpendicular to a mirror mounted directly to the PZT 14. Voltage is applied to PZT element 14 to induce a change in the length of the gap $G_R$. Again, the voltage necessary to drive PZT 14 to the position where the length of the gap $G_R$ matches the length of the gap $G_s$ is directly proportional to the length of the gap $G_s$ so that the drive voltage can be directly related to the measure of the output. Notably, detector D converts the optical signal into an electronic signal and is used to determine when the match in the length of these gaps has occurred.

Notably, the signals generated in FIGS. 2a and 2b have the same characteristic shape although inverted when viewed in transmission vs. reflectance, i.e. configured as FIG. 1a (transmission) vs. FIG. 1b (reflectance).

Figure 3:
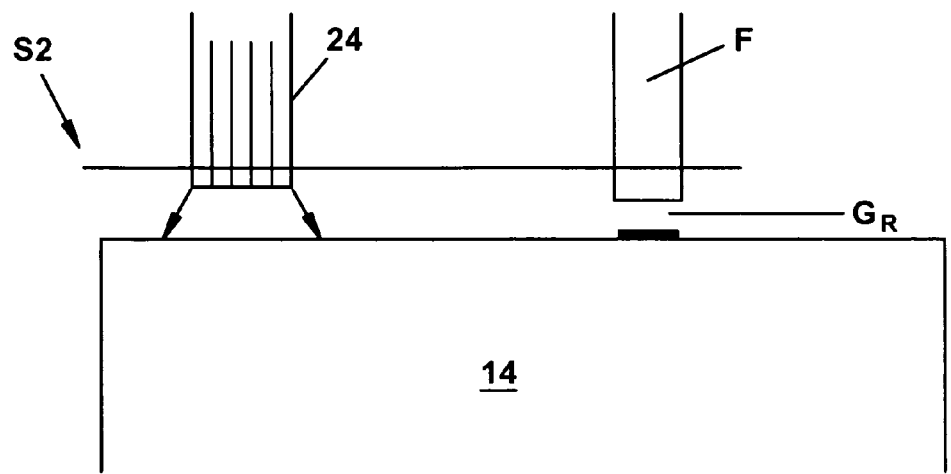
FIG. 3 shows an alternative embodiment of the optical readout probe used to verify the position of the gap in the optical cross-correlator and improve the accuracy of the invention.
Figure 4:
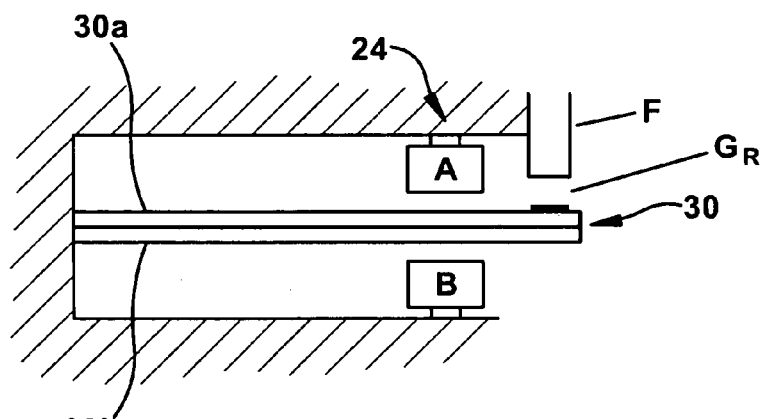
FIG. 4 shows alternative schematic for a reflective optical cross-correlator.

The PZT actuator 14 may be configured as a stack or as a bimorph as illustrated in FIG. 4. The bimorph 30 is a beam fixed at one end, consisting of two layers 30a, 30b of lead-zirconate-titanate material that are excited out of phase. This causes one layer to expand while the other contracts which results in deflection of the beam. The advantage of the bimorph configuration shown in FIG. 4 is that the desired displacement can be obtained at a lower drive voltage because of the lever arm effect of the beam which comprises bimorph 30. This configuration is also particularly well suited to the use of secondary readout means (i.e., a means to verify the position of interferometer S2), described below. Another configuration of the optical readout 24 which can be used as a means of verifying the position of the sensors S2 is shown in FIG. 3, with the reference numerals therein corresponding to FIG. 4.

Overall system accuracy can be improved through variations to the elements shown in FIGS. 1a and 1b which provide the means for independent measurement of length of the gap $G_R$. Such means include the use of one or more additional reference sensors to verify the position of the interferometer S2 and can be configured as but not limited to strain gage, capacitive sensor, or a linear variable differential transformer (LVDT). All of these items are commercially available. A comparison of their characteristics are summarized in Table 1.

TABLE 1

Comparison of candidate readout methods for PZT length assuming at range of 15 um

|  | Strain Gage | LVDT | Capacitance |
|---|---|---|---|
| Resolution | 1 nm | 10 nm | 0.1 nm |
| Bandwidth | Up to 5 kHz | Up to 1 kHz | Up to 10 kHz |

While each of the items listed in Table 1 can be used in the present invention, it is important to note the limitations of each. The small bandwidth makes the LVDT and the strain gage less attractive than the optical sensor and capacitance sensor. Both the capacitance and the strain gage may have long-term stability problems due to creep of the adhesive needed to bond these sensors to the PZT. Nevertheless, these options, along with others known to those skilled in the art, are available in configuring an enhanced system according to the schematic of FIG. 1a or 1b.

As seen in FIG. 4, the optical measurement system 24 used as a positional verification device may also consist of two optical readout devices A, B, one on each side of the PZT which deliver light to the PZT and one on each side of the PZT which receive light reflected from the PZT. Each assembly A, B consists of a light delivery fiber and detector to measure the light intensity. The power delivered to the two detectors is a function of the length of the gap between the ends of the sensor fibers and the PZT. With a probe on either side of the PZT, the signal from one increases while the other decreases. The ratio of the two signals is independent of source intensity fluctuations and gives an indirect measure of the length of the gap in the optical cross-correlator. This optical reference sensor could be improved further by using fiber bundles in lieu of single fibers. Proximity sensors based this principle have been demonstrated for high speed, high-resolution measurement.

Figure 5:
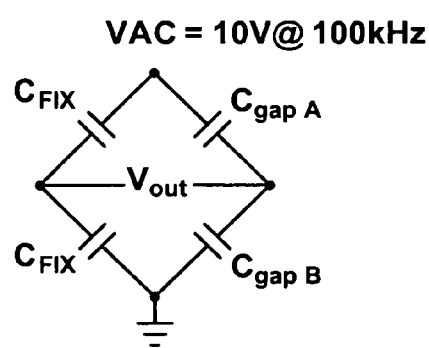
FIG. 5 shows an electronic schematic of a capacitance bridge that may be employed as a reference sensor in the embodiment depicted in FIG. 4.

A capacitance sensor 50 which can be used as the positional verification device is depicted in FIG. 5, although this particular arrangement can be relatively expensive. As shown in FIG. 5, the particular arrangement of capacitors ($C_{FIX}$, $C_{gapA}$, $C_{gapB}$) is directed toward a positional verification sensor used with a PZT bender. The fixed capacitors $C_{FIX}$ act as references in a bridge circuit that measures capacitance differences. With reference to FIG. 4, assume that the PZT bender 30 is a capacitor electrode placed between electrodes positioned in place of the optical readout device fibers A and B shown FIG. 4. Then as the bender 30 moves closer to A, the capacitance of Capacitor A increases and capacitance of Capacitor B decreases. The capacitance change is detected as a change in voltage $V_{out}$ from the bridge circuit. A similar arrangement could be devised using a resistive bridge.

An alternative to the optical reference sensor would be to make a direct measurement of the length of the gap in the PZT interferometer (rather than the relative position of the PZT as in FIGS. 3-5 above), thereby eliminating the problems associated with calibration, long term drift, resolution, repeatability and accuracy of the PZT. This alternative employs a reference light source whose wavelength and intensity may slowly vary over time and thus are unknown at any point in time. Through this embodiment, the system self-calibrates the unknown reference light source periodically as explained below and the reference light is used to make an absolute measurement of the length of the gap in the PZT interferometer.

Figure 6A:
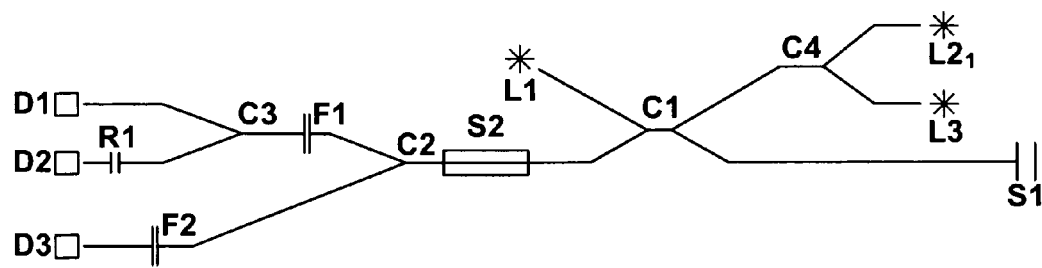
FIG. 6a shows an alternate embodiment of the invention which includes the use of three separate light sources to determine the precise length of gap in the optical cross-correlator.
Figure 6B:
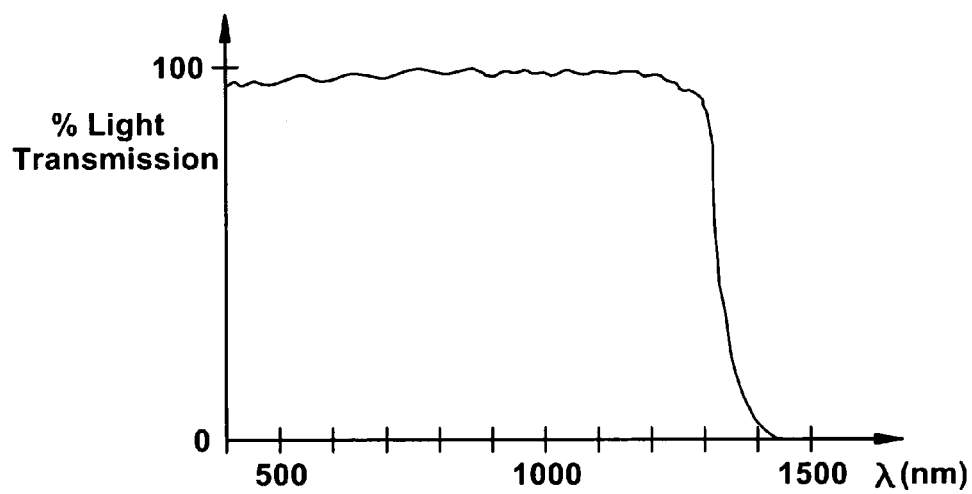
FIG. 6b shows transmission versus wavelength for cut-off filter F1.

Such an alternate embodiment is shown in FIG. 6a. A light source L1 (preferably a Tungsten lamp) is connected to a 2×2 light splitter C1 where the light is transmitted to the Fabry-Perot sensor S1 through one of the output legs of C1. The other output leg is connected to a pair of light sources L2, L3 (preferably a VCSEL at 1520 to 1540 nm wavelength and an ELED at 1310 nm wavelength) through a coupler C4. Reflected light from the sensor S1 travels back through splitter C1 to the interferometer S2 (which includes PZT 14 for controllably varying the length of gap $G_R$, all not shown in FIG. 6a), which acts as an optical cross-correlator for the modulated light from the sensor. Light transmitted through interferometer S2 is modulated as the gap $G_R$ is changed by voltage applied to the PZT 14. The modulation pattern in transmission is similar to the peak-to-valley modulation pattern in reflection from a Fabry-Perot sensor. The cross-correlated light from source L1 then travels through a splitter C2 and through a cut-off filter F1, which blocks (does not pass) the 1500 nm wavelength light from the VCSEL (see FIG. 6b), but passes all shorter wavelengths. The filtered light then travels through splitter C3 to detectors D1 and D2. The intensity of the light signal at detector D1 (silicon) is converted into an electrical current. Notably the light from the ELED source L3 is not filtered and is transmitted to detector D1. Since D1 is a silicon detector it is insensitive to the ELED wavelength (1310 nm).

Light from sources L2, L3 travels through splitter C1 and the interferometer S2, which does not perform a cross-correlation because the light from sources L2, L3 has not been modulated (i.e., it does not come into contact with interferometer S1). However the interferometer S2 modulates the light from sources L2, L3. After splitting at C2, the light from source L2 passes through the cut-off filter F1, through a second interferometer R1 with a known, stable fixed gap and then onto detector D2 (InGaAs). R1 acts as an optical cross-correlator for the ELED light modulated by the PZT interferometer, and detector D2 converts the cross-correlated ELED light into an electrical current. Notably the long wavelength light from the tungsten lamp source L1 is not filtered by F1 and is transmitted to detector D2 along with the ELED light. Since the intensity from the tungsten lamp is very low compared to the ELED, the tungsten light has a negligible effect on the signal at detector D2.

Figure 6C:
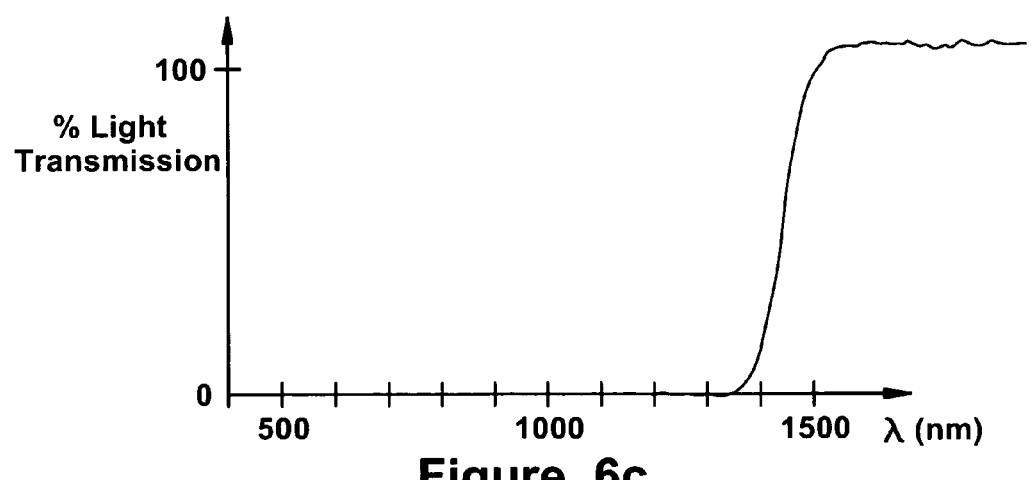
FIG. 6c shows transmission versus wavelength for cut-on filter F2.

After splitting at C2, the light from the VCSEL source 51 travels through a cut-on filter F2, which passes the long wavelength VCSEL light but blocks the short wavelengths from the tungsten lamp and ELED (see FIG. 6c). The light is then detected by D3 (InGaAs), which converts the VCSEL light into an electrical current.

Figure 6D:
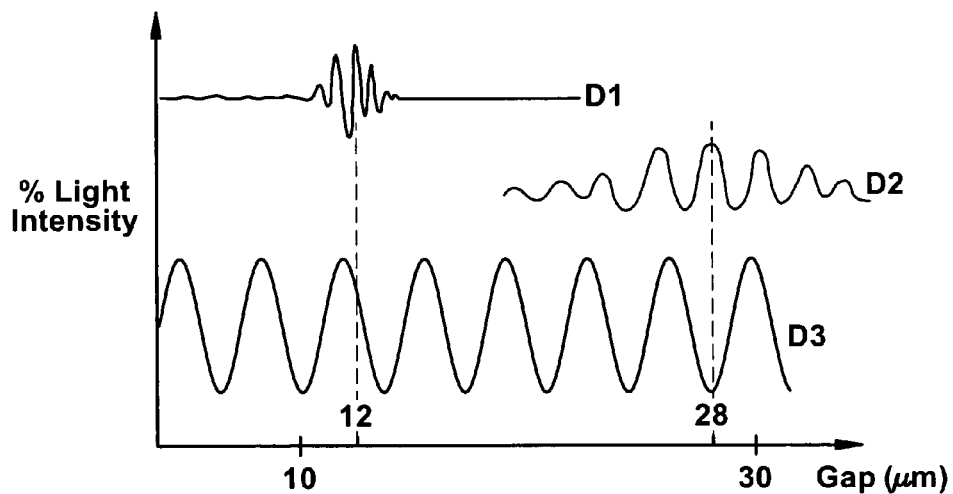
Figure 6E:
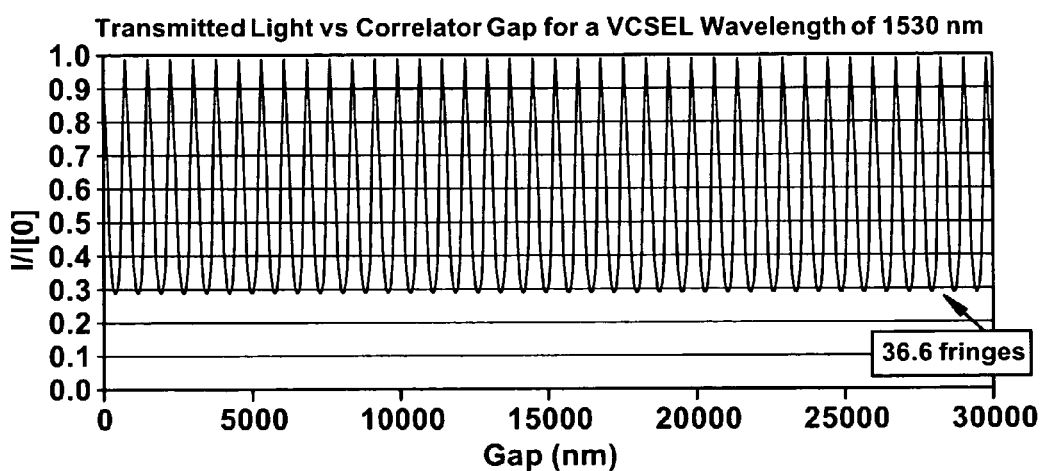
FIG. 6e shows a typical output (light intensity versus gap for VCSEL starting from zero gap) for a fixed sensor gap where the length of the optical cross-correlator gap varies when a laser light source is used according to the invention.

FIGS. 6d and 6e show the signals generated at each detector as the interferometer S2 is moved through a range of motion corresponding to the gap range (FIG. 6d), and the full range of motion 0 to 30 um in FIG. 6e. The output of detector D1 is a correlation pattern that results from the broadband light from the tungsten source that is modulated and reflected by the sensor and cross-correlated by the PZT interferometer. In the example shown in FIG. 6d, the sensor gap is 12 um. The output from detector D2 is a different correlation pattern that results from the ELED light modulated by the interferometer S2 and cross-correlated by the fixed reference interferometer at R1. In the example shown in FIG. 6d, the fixed reference interferometer R1 gap is 28 um. The output from detector D3 is a signal that is modulated by the interferometer S2 only and not cross-correlated. The modulation peaks (also called interference fringes or just "fringes") from the output of detector D3 are spaced $\lambda/2$ apart, where $\lambda$ is the VCSEL wavelength. Each fringe may be identified by an integer order number, and the light intensity I is described by the relationship $$I=1/[1+F\sin^2(2\pi G_R/\lambda)] \quad (1)$$

where $G_R$ is the length of the gap in the interferometer S2 and F is a constant. When the interferometer S2 is positioned to zero gap (home position) then as the PZT gap increases, the signal from detector D3 changes as shown in FIG. 6e. As the voltage continues to increase, software tracks the output from D3 and counts the number of fringe peaks and the fractional part of the next fringe when the length of the gap in the interferometer S2 is equal to the length of the gap in the reference interferometer R1, i.e. 28 um. The fractional part of the next fringe is a function of the light intensity which can be resolved to 1%.

The system operates in two modes, i.e. calibration mode and measurement mode. In calibration mode, the PZT 14 and interferometer S2 are scanned through the range of motion 0 to 30 um. The signal from detector D2 reaches a peak when the length of the gap $G_R$ in interferometer S2 is equal to the length of the gap at reference interferometer R1, which has a fixed and known gap of 28 um in the example in FIG. 6d. Detector D3, which measures light intensity from the VCSEL is monitored during calibration. Refer to Table 2. There is uncertainty in the wavelength of the VCSEL and this uncertainty ranges from 1520 to 1540 nm. When the length of the gap $G_R$ in the interferometer S2 is scanned through the range of motion 0 to 30 um, the fringes are counted. Zero gap is verified when the VCSEL signal from detector D3 does not change with applied voltage to the PZT. As shown in FIG. 6e, 36.6 fringes are counted when the laser wavelength is 1530 nm (1.53 um). Using Table 2 and Equation (1), the fractional fringe count calibrates the VCSEL wavelength. As shown in Table 2 and verified in FIG. 6d, there are 36.6 VCSEL fringes between the PZT starting position and the R1 gap, which is known to be fixed at 28 um and is periodically monitored by the ELED source through the output from detector D2.

In measurement mode, the voltage to the PZT 14 is changed from its value that resulted in a gap of 28 um until the output signal from D1 reaches its peak as shown in FIG. 6d. As the applied voltage to the PZT is changed, software keeps track of the fringe count from detector D3. When the peak value in the correlation pattern is detected by D1, the fractional fringe count is recorded and subtracted from the fringe count obtained in calibration mode. Through Equation (1), the sensor gap is calculated in terms of the absolute wavelength of the VCSEL. Thereafter in measurement mode, the PZT voltage is dithered so that the correlation pattern signal from D1 is tracked by software. Changes in the peak value are tracked by fractional changes in fringe shift at detector D3. Recalibration is performed periodically.

TABLE 2

Calibration of the VCSEL Wavelength

| VCSEL Wavelength | Known Gap R1 (um) | Fringes |
|---|---|---|
| 1520 | 28 | 36.84 |
| 1521 | 28 | 36.82 |
| 1522 | 28 | 36.79 |
| 1523 | 28 | 36.77 |
| 1524 | 28 | 36.75 |
| 1525 | 28 | 36.72 |
| 1526 | 28 | 36.70 |
| 1527 | 28 | 36.67 |
| 1528 | 28 | 36.65 |
| 1529 | 28 | 36.63 |
| 1530 | 28 | 36.60 |
| 1531 | 28 | 36.58 |
| 1532 | 28 | 36.55 |
| 1533 | 28 | 36.53 |
| 1534 | 28 | 36.51 |
| 1535 | 28 | 36.48 |
| 1536 | 28 | 36.46 |
| 1537 | 28 | 36.43 |
| 1538 | 28 | 36.41 |
| 1539 | 28 | 36.39 |
| 1540 | 28 | 36.36 |

Another alternative to the optical reference sensor relies on making a direct measurement of the length of the gap in the PZT interferometer and thereby again eliminates the problems associated with calibration, long term drift, resolution, repeatability and accuracy of the PZT and the complexities of the embodiment described above. This alternative employs a very stable light source such as a HeNe laser whose wavelength is more stable than other sources. Through this embodiment, the need for system calibration occurs primarily at system startup.

Figure 6F:
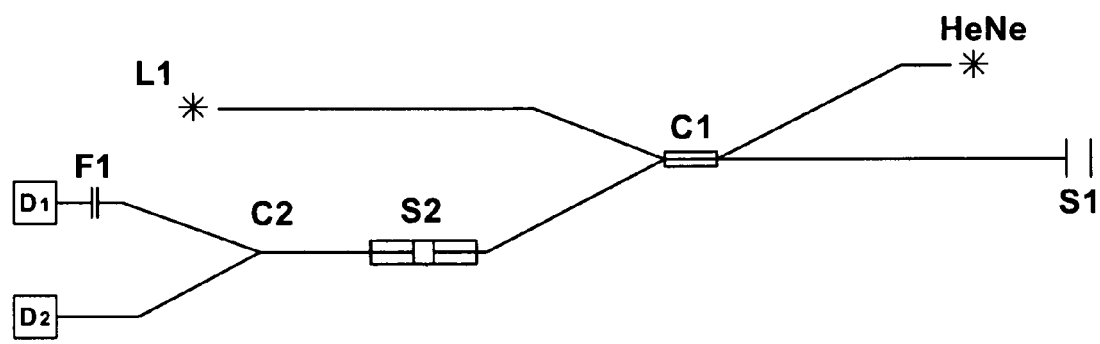
FIG. 6f shows another alternate embodiment of the invention.

This alternative is described in FIG. 6f. A light source L1 (preferably a Tungsten lamp) is connected to a 2×2 light splitter C1 where the light is transmitted to the Fabry-Perot sensor S1 through one of the output legs of C1. The other output leg is connected to a HeNe laser light sources with a wavelength 633 nm. Reflected light from the sensor travels back through splitter C1 to the interferometer S2, which acts as an optical cross-correlator for the modulated light from the sensor S1. Light transmitted through the interferometer S2 is modulated as the gap is changed by voltage applied to the PZT 14. The modulation pattern in transmission is similar to the peak-to-valley modulation pattern in reflection from a Fabry-Perot sensor.) The cross-correlated light then travels through a splitter C2 and through a cut-on filter F1, which blocks (does not pass) the 633 nm wavelength light from the HeNe laser but passes all longer wavelengths. The filtered light travels to detector D1 where the intensity of the light signal is converted into an electrical current.

Light from the HeNe source travels through splitter C1 and the interferometer S2, which does not perform a cross-correlation because the light from the HeNe has not been modulated. However the interferometer S2 modulates the light from the HeNe. After splitting at C2, the light from the HeNe travels to detector D2 (Si). Notably the long wavelength light from the tungsten lamp source L1 is transmitted to detector D2 along with the HeNe light. Since the intensity from the tungsten lamp is very low compared to the HeNe, the tungsten light has a negligible effect on the signal at detector D2.

FIGS. 6d and 6e show the signals generated at each detector as the interferometer S2 is moved through a range of motion corresponding to the gap range (FIG. 6d). The output of detector D1 is a correlation pattern that results from the broadband light from the tungsten source that is modulated and reflected by the sensor and cross-correlated by the interferometer S2. In the example shown in FIG. 6d, the sensor gap is 12 um. The output from detector D2 is a signal that is modulated by the PZT interferometer only and not cross-correlated. The modulation peaks (also called interference fringes or just "fringes") from the output of detector D2 are spaced $\lambda/2$ apart, where $\lambda$ is the HeNe wavelength. Each fringe may be identified by an integer order number, and the light intensity I is described by the relationship $$I=1/[1+F\sin^2(2\pi G_R/\lambda)] \quad (1)$$

where $G_R$ is the length of the gap in the interferometer S2. When the interferometer S2 is positioned to zero gap (home position) then as the PZT gap increases, the signal from detector D2 changes as shown in FIG. 6e (Note the HeNe wavelength is different from the VCSEL but the concept is the same.) In general, the starting point for the light intensity is not zero as shown but can have any value between 0 and 1. As the voltage continues to increase, software tracks the output from D2 and counts the number of fringe peaks and the fractional part of the next fringe when the length of the gap in the PZT interferometer is equal to the length of the gap in the sensor, i.e. 12 um. The fractional part of the next fringe is a function of the light intensity which can be resolved to 1%.

As before, the system operates in two modes, i.e. scan mode and measurement mode. In scan mode, the PZT is scanned through the range of motion 0 to 30 um. The signal from detector D1 reaches a peak when the length of the gap at the interferometer S2 is equal to the length of the gap in the Fabry-Perot sensor S1. Detector D2, which measures light intensity from the HeNe is monitored during scan and software keeps track of the fringe count continuously. Since there is negligible uncertainty in the wavelength of the HeNe, there is no need for a wavelength calibration as there is with a VCSEL or other unstable light source. Once the peak intensity in detector D1 is found, the system changes into measurement mode.

In measurement mode, the sensor gap is calculated in terms of the absolute wavelength of the HeNe using Equation 1. Thereafter in measurement mode, the PZT voltage is dithered so that the correlation pattern signal from D1 is tracked by software. Changes in the peak value are tracked by fractional changes in fringe shift at detector D2.

The frequency response is limited by the PZT scan rate and the absolute measurement accuracy is determined by the repeatability of the gap measurement using the reference sensor.

Yet another means for improving the resolution and accuracy involves the use of a time-based calculation on the absolute position of the Fabry-Perot sensor. This embodiment eliminates some of the hysteresis and creep in the lead-zirconate-titanate (PZT) modulator.

Figure 7:
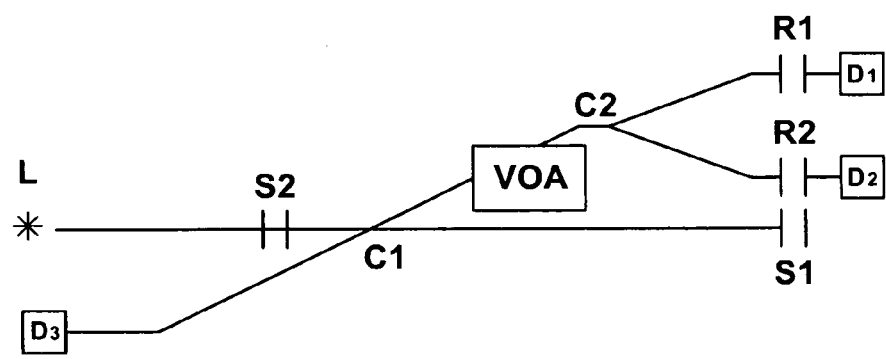
FIG. 7 shows an embodiment for the invention which includes two reference interferometers to determine the positioning of the optical cross-correlator in transmission mode on the basis of time.

The elements of the time-based system are shown in FIG. 7. Light source L preferably a tungsten light source travels through an oscillating interferometer that changes its length of gap at a constant frequency and amplitude. The oscillating interferometer S2 includes a PZT or other high speed oscillator. The light from L is modulated by the interferometer S2 and travels through splitter C1 to the Fabry-Perot sensor on one leg and through a VOA (variable optical attenuator) to a second splitter C2 where the light travels through reference interferometers R1 and R2 which have fixed and known gaps. These reference interferometers R1, R2 and the Fabry-Perot sensor S1 serve as optical cross-correlators for the modulated light from the oscillating interferometer S2. The purpose of the VOA is to reduce the reflected light signal that can interfere with reflected signal from the Fabry-Perot sensor at detector D3.

The cross-correlated signals from interferometers R1, R2, and the Fabry-Perot sensor S1 are monitored continuously by detector $D_1$, $D_2$, and D3 respectively (although the invention can be configured for fewer than three detectors as shown in FIGS. 9a-9d and described otherwise below). Notably, the reference interferometers R1 and R2 and scanned gap $G_{RT}$ operate in transmission mode, whereas the Fabry-Perot sensor S operates in reflection mode.

Figure 8:
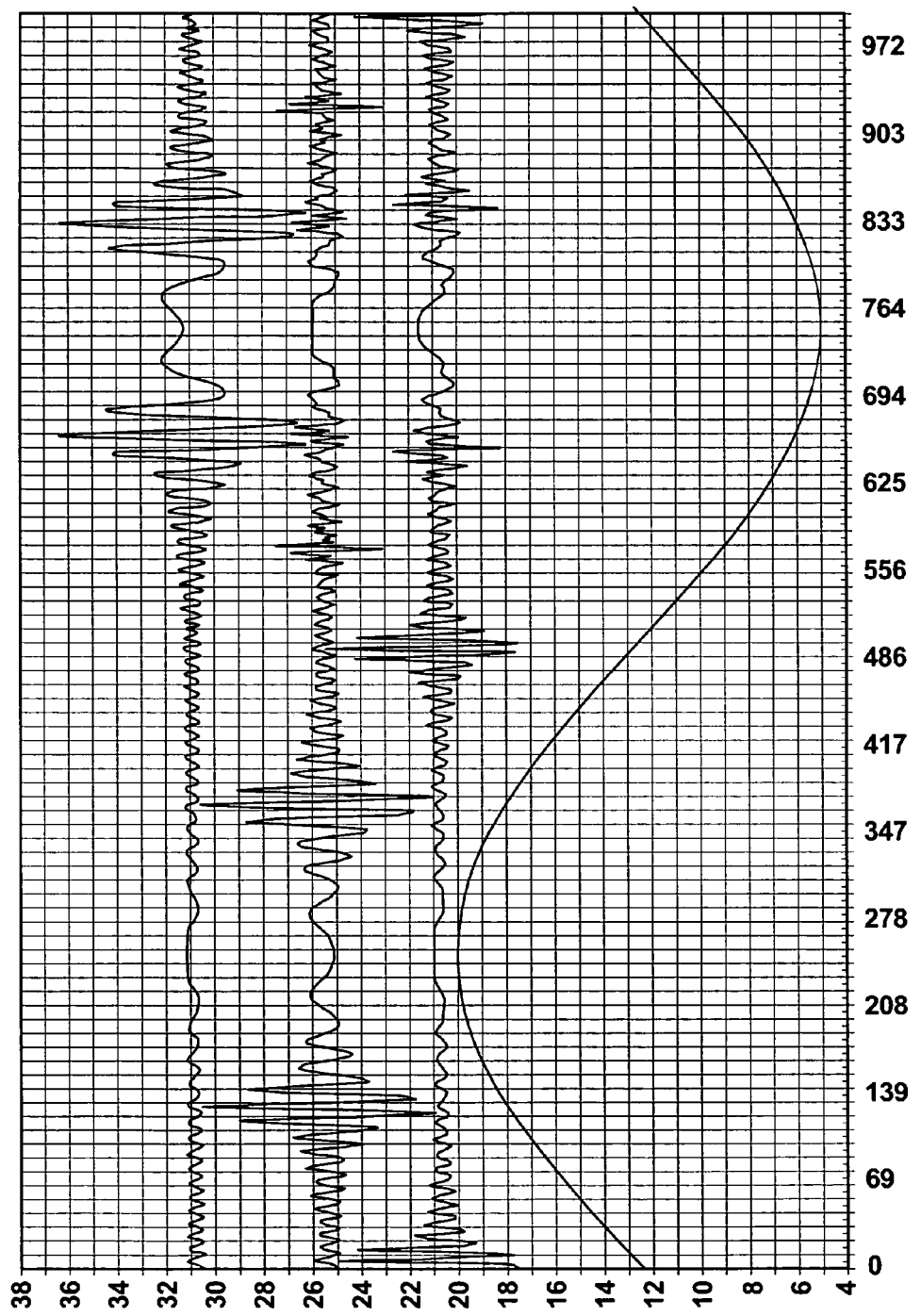
FIG. 8 shows a plot of the various signals generated and monitored by the embodiment depicted in FIG. 7 for two fixed reference sensors that have gaps with lengths of 6000 nm and 25,000 nm respectively, and a sensor with a gap of 15,000 nm over one cycle of oscillation.

As oscillating interferometer S2 travels through its range of motion, the gap $G_R$ provides a range of gaps as a function of time. Each of the three detectors (D1, D2, D3) sees a peak in the correlation burst pattern when the length of the gap $G_R$ matches the length of the gap in each respective interferometers (R1, R2, S). The peak detector signals from each interferometer S1, R1, R2 are observed as a precise point in time that is a function of the amplitude and frequency of the oscillation gap $G_R$ in the oscillating interferometer S2. Refer to FIG. 8. The signal from $G_R$ gap. The peak intensity occurs at that moment in time during the oscillation when the gap $G_R$ equals the gap in reference interferometer R1, R2, and Fabry-Perot sensor S1.

The Fabry-Perot sensor gap $G_S$ is calculated based on the known precise gap and time of occurrence of the peak intensity of reference interferometers R1 and R2 and the sinusoidal functional dependence of the oscillating displacement of the range of gaps from $G_R$.

Figure 10:
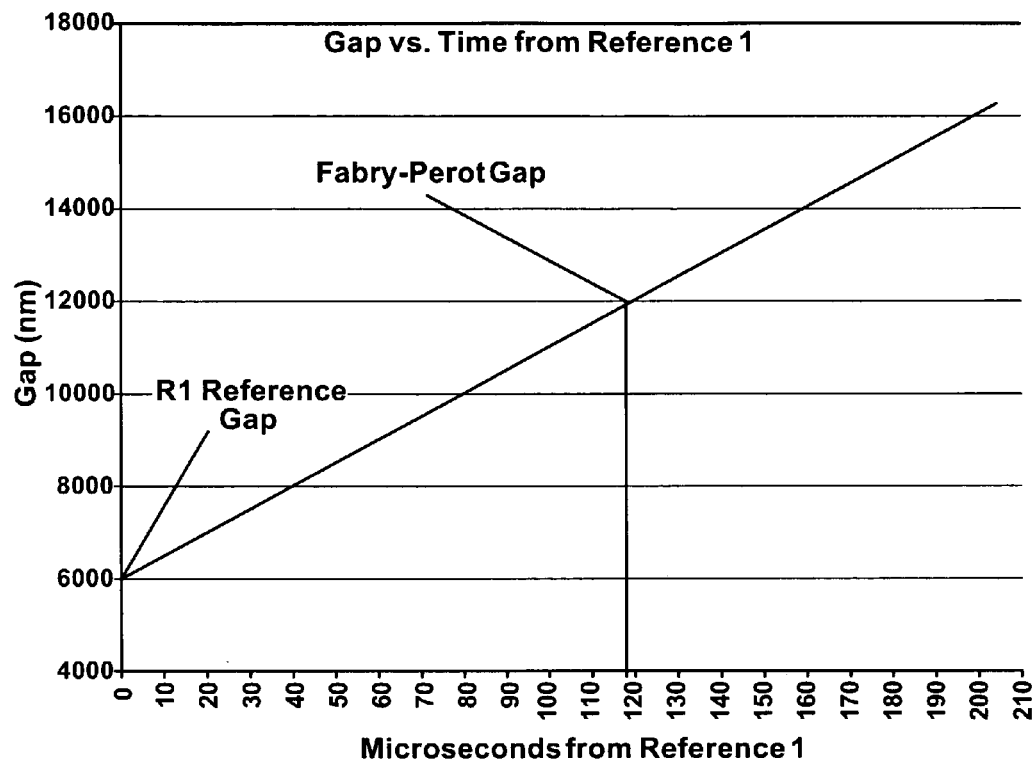
FIG. 10 shows the absolute gap of 12,000 nm in the Fabry-Perot sensor when the peak amplitude of the time difference between the reference interferometer and the Fabry-Perot is 118 microseconds based on the linearization of the sinusoidal function.

These three signals as described are plotted in FIG. 8, with $P_{R1}$ representing the signal generated by the detector associated with R1, $P_{ST}$ representing sensor S1 and $P_{R2}$ representing R2. The microprocessor based timing circuit provides the signal plot $P_T$ in the bottom trace of FIG. 8. The microprocessor measures the time differences $t_1$ between the R1 peak and the Fabry-Perot sensor S1 peak and time difference $t_2$ between R1 peak and the R2 peak. After linearization of the sinusoidal displacement of $G_{RT}$, the sensor gap $G_{ST}$ can be computed from FIG. 10 and the following equation:

$$G_S = (t_1/t_2)[G_{R2} - G_{R1}] + G_{R1}$$

where $G_{R1}$ is the gap of R1 and $G_{R2}$ is the gap of R2.

The equation for above assumes a linear change of the scanned gap with time. In fact, the change is sinusoidal and must be modified accordingly to deal with the nonlinearity. Specifically, the scanned gap is driven sinusoidally at frequency ω and can be expressed as $$G = A + B \cos(\omega t)$$

The correlation peaks of interest occur at the times when:

$$G_{R1} = A + B \cos(\omega t_o)$$

$$G_S = A + B \cos(\omega t_1)$$

$$G_{R2} = A + B \cos(\omega t_2)$$

where $G_{R1}$ is the gap of the short reference sensor R1 (as stated above, a known distance); $G_S$ is the gap of the sensor monitoring the unknown gap; $G_{R2}$ is the gap of the long reference sensor R2 (also a known value); and t represents the times of occurrence of the peaks in the correlation burst.

Using the equations and information above, it becomes possible to calculate the actual value of $G_S$ through accurate time measurement, as achieved by the aforementioned microprocessor, as follows:

$$G_S = G_{R1} + (G_{R2} - G_{R1})[(\cos(\omega t_o) - \cos(\omega t_1))/(\cos(\omega t_2) - \cos(\omega t_o))]$$

Notably, the equation above can be manipulated and used to achieve accurate time-based measurements according to any of the alternative embodiments described below.

To maximize the signal the lamp should be a quartz-halogen type that allows high filament temperature while maintaining long life. Exemplary filament temperatures in the range of 2700 K can burn for about 10,000 hours, while temperatures exceeding 3100 K drop that life span to around 100 hours. Notably, manufacturers define the lamp properties in terms of color-temperature, which is approximately 90 degrees higher than the actual filament temperature.

Clearly, there is an advantage to using the higher temperature lamp, but the added power comes at a cost of lifetime so there is a trade-off. One possible arrangement would be to use a lower temperature light source, and if there is a signal level problem, the higher temperature lamp can be substituted or integrated into system 10 as an alternative.

Additional consideration should be given to the radiance of the light source, which impacts the power delivered throughout the system. Further discussion of these principles can be found in the Photonics Handbook, the relevant portions of which are hereby incorporated by reference. As recognized by those skilled in the art, the radiance of the lamp filament can be determined with the temperature and the emissivity of the filament material (preferably tungsten). The radiance is also a function of wavelength, while the total integrated irradiance over the spectral range from 550 mn to 1050 nm is the quantity of interest for tungsten. Of course, these spectral limits are somewhat arbitrary, but are based on the basic fact that the detector response curve falls to about ½ its maximum value at these wavelengths.

The fraction of the input power delivered to the detectors is based on the reflectance from the sensors S1, S2, R1, R2. Ideally, this reflectance measured should be approximately 50% of the input light power.

Additional alternative arrangements of the optoelectronic components for system 100 are possible, although all of these are fundamentally rooted in the comparative calculation principle set forth in system 10. For all of the variations discussed below, the previous designations utilized in FIG. 7 are applicable to all such alternatives unless specifically given a different meaning. By the same token, the denotations for reflectance and input power on FIG. 7 are for the same purposes as described in FIGS. 9a-9d.

The first such alternative arrangement is presented 9a. Light source L is provided to splitter $C_1$. Notably, all of the sensors, as well as scanned gap $G_R$ operate in reflection mode. The reflectance from each gap is indicated by $r_i$ and beside the detector is indicated the magnitude of the power delivered through the system arrangement, where Io is the input power. Detector D is used to monitor all three sensors S1, R1, R2 through appropriate routing by splitters $C_2$ and $C_3$, and the power delivered to the detector consists of three terms, one from each reference and one from the sensor. In turn, these terms represent the product of two reflectances depending upon the routing of the light (e.g., $r_{RT} \times r_{R1}$) and are not simple products but rather the correlation product that yield individual burst patterns. Adjusting for these variations, further calculations are consistent with the principles described above (also depicted on FIG. 9a).

Figure 9A:
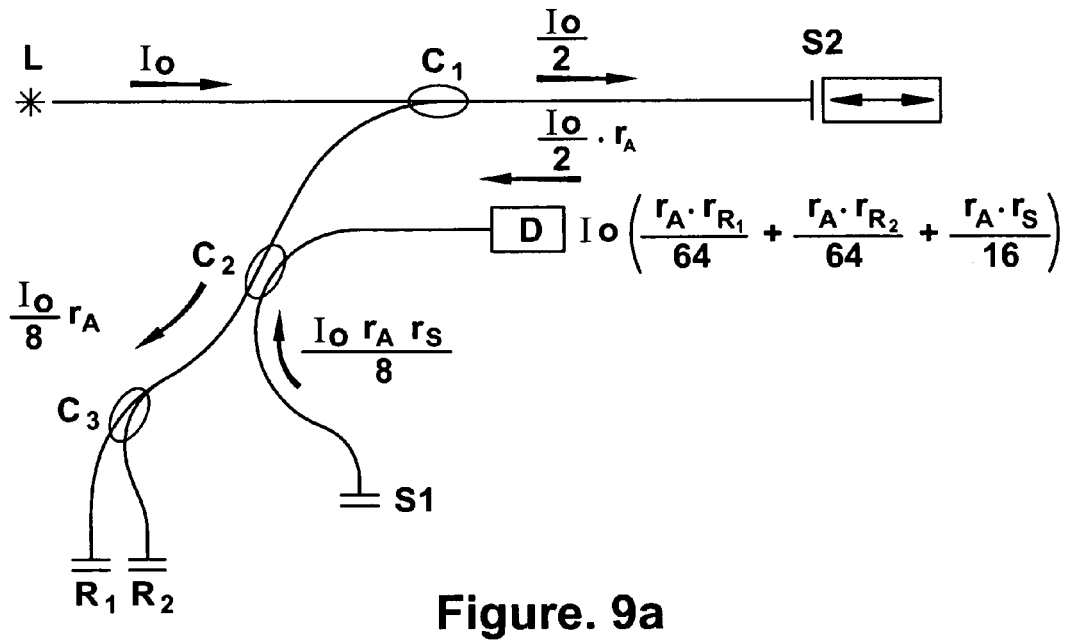
FIGS. 9a-9d depict alternative arrangements for the invention, also including signal calculation information.
Figure 9B:
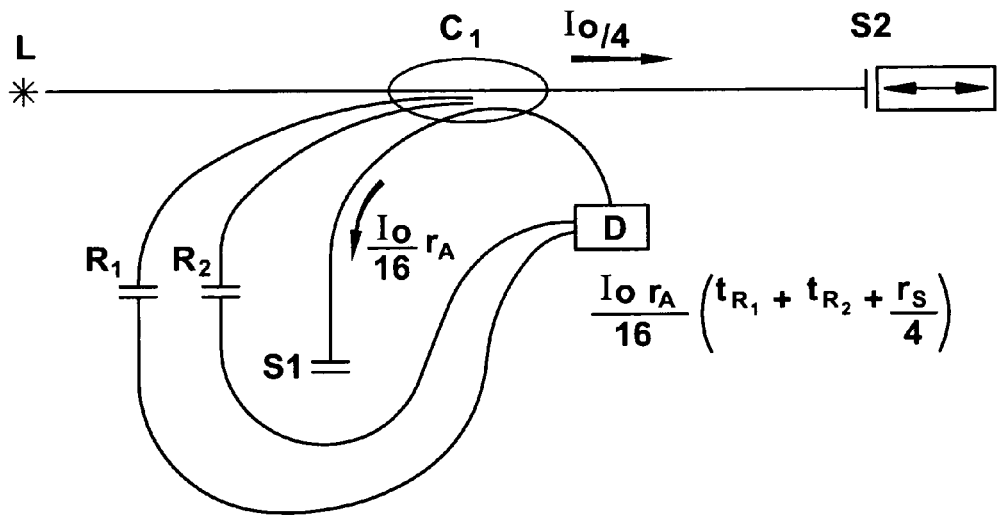

FIG. 9b shows another alternate embodiment that employs one 2×4 splitter in place of the three splitters shown in FIGS. 7 and 9a. Only one detector D is required.

Figure 9C:
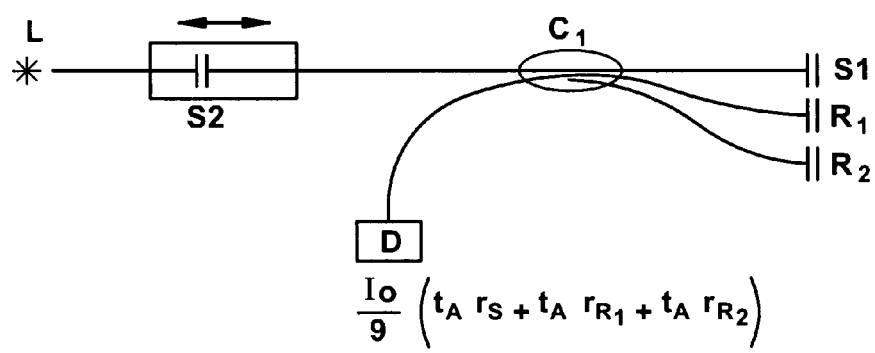

FIG. 9c shows yet another configuration requiring a single 2×2 splitter and a single detector D. Significantly, the first two terms in the expression for the power to the detector are simply the feed-through of half the power input to the splitter. These terms do not contain any correlation information and simply add noise.

Figure 9D:
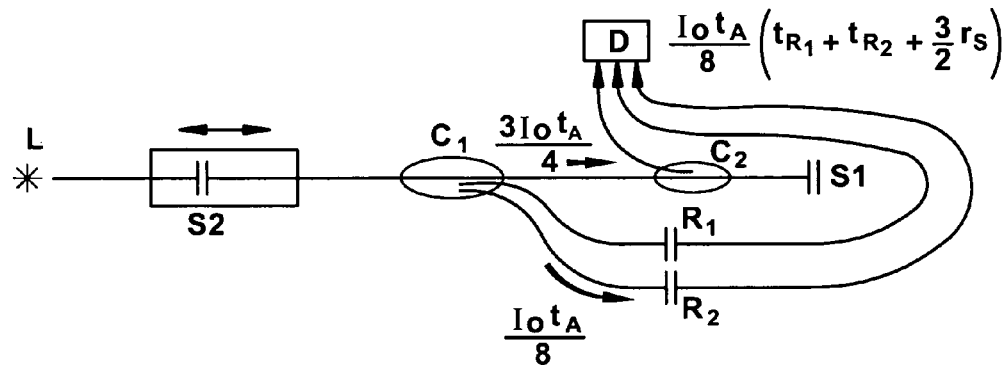

FIG. 9d shows yet another configuration requiring a single 2×2 splitter and a single detector D where the reference interferometers operate in transmission mode rather than reflection.

The signal levels provided for each configuration are summarized in Table 3. In some configurations, the signal level for the reference interferometers is different from that for the sensors. In these cases, Table 3 lists the worst case. It is assumed that the reflectance and transmittance of all sensors is the same, so the subscripts that are used for clarity in the Figures are omitted in Table 3. It is also assumed that there is no excess loss in the splitters.

TABLE 3

Comparison of optoelectronic configurations

| Figure reference | Signal Level | I/Io |
|---|---|---|
| FIG. 7 | rr/16 | .026 |
| FIG. 9a | rr/64 | .006 |
| FIG. 9b | rr/64 | .006 |
| FIG. 9c | trtt/4 | .029 |
| FIG. 9d | tr/9 | .034 |

To make valid comparisons based on the expressions in Table 3 requires quantification of the cross-correlation terms tt, tr, and rr. Based on 30% reflectance for the separated mirrors that define the gap for each sensor, the cross-correlation products are conservatively estimated to be:

tt=0.37; tr=0.31; and rr=0.41. Using these values enables evaluation of the products in column 2 of Table 3 to obtain the fraction of power delivered to the detector, which is given in column 3. The preferred configuration of FIG. 7 is the best of the first five (FIG. 7-FIG. 9d).

It is appropriate to perform a signal-to-noise ratio analysis. Consider, for example a sensor signal update rate of 10 kHz. The scanned gap is sinusoidally driven by the oscillator at 5 kHz, providing the desired 10 kHz update rate. Assuming a total scanning range of 20 µm, the scanned gap is expressed as $$g(t)=10 \text{ µm}(\sin \omega t)+Q \quad (5)$$

where Q is the gap in the absence of scanning and $\omega=2\pi(5000)$rad/sec

The scanning rate, dg/dt, is a function of time. The maximum scan rate occurs at the time when sin $\omega t$=0. At this point 10 µm(sin $\omega t$)≈10 µm ($\omega t$)

So, $dg/dt$=10 µm $\omega$=(10)2$\pi$(5000)=3.14×10$^5$ µm/sec
or 314 nm/µsec    (6)

A correlation model can be used to provide results in terms of intensity as a function of correlation element gap. The gap is converted to time using the scan rate Equation (6) above, and the correlation pattern can be viewed as a quasi-sinusoid with a frequency of 0.84 MHz. There are no high frequency features of interest. Accordingly, the photodiode amplifier is designed as a band pass amplifier with a range of 100 kHz to 1 MHz. This is the frequency response of the photodiode signal and not to be confused with the time resolution required to measure the sensor gap with a resolution of 0.1%, (10 nm assuming a full scale range of 10 µm). A 10 nm gap change converted to a time base using Equation (6) reveals a 32 nsec change in time. As a minimum, the time base needs a resolution of 32 nsec.

To quantify the effect of noise, consider 1 MHz sine wave with variable amplitude added to the signal. A 1 MHz noise frequency is considered because higher frequencies are filtered out and lower frequencies do not affect the peak. Noise with frequency content comparable to that of the correlation peak, however, does affect both the amplitude and position of the peak. Ideally, the signal processor should be capable of operating with SNR=50.

The amplifier noise increases with the capacitance of the photodiode. Thus a photodiode is needed with the smallest capacitance possible. A UDT Sensors PIN-020A has an active area with a diameter of 510 µm and a capacitance of 1.0 pf when reverse biased at 10 V.

Other noise sources that need to be considered for systems 10, 11 or 12 include: shot noise due to DC signal current plus dark current; Johnson noise from the feedback resistor; noise due to amplifier input current noise; and noise due to amplifier input voltage noise. Conservative calculations show that the combined noise terms can be estimated and expressed as an RMS value of about $i_T$=3.8×10$^{-10}$ A. Recall that the estimated light power level delivered to the detector was determined in paragraph 88 to be approximately 5.2×10$^{-8}$ Watts. The effective detector responsivity is on the order of 0.3 A/W, and the expected signal current is 1.6×10$^{-8}$ amps. Accordingly, the signal-to-noise ratio is 1.6×10$^{-8}$/3.8×10$^{-10}$=42. While this SNR falls slightly below the preferred value of at least 50, it is a worst-case estimate. The SNR can be improved by modifying the arrangement shown in FIG. 1 so that more light is transmitted through the system. In addition, the SNR can be improved through proper choice of light source. A tungsten filament lamp was assumed but other alternatives are a quartz halogen lamp or super luminescent light emitting diode. Notably, these examples are cited merely as illustrative solutions to improve the performance of the inventive system, and other solutions for improving the SNR and/or the performance of the system will be apparent to those skilled in the art and this disclosure is expressly intended to contemplate such improvements.

In the same spirit, the ideal performance ranges for system 10 as shown in FIG. 7 include gap $G_{ST}$ which may be anywhere from 5 to 18 µm in length and a visible white light tungsten filament lamp or quartz halogen lamp. Light is delivered to the scanned gap through a 2×2 splitter. Since both splitter outputs illuminate the scanned sensor driven by the oscillator, the light loss budget and SNR can be improved by a factor of 2 compared with the estimated power discussed above. The reflected light from the scanned sensor is modulated by the oscillator, split and transmitted through a 2×2 splitter to the sensor S and also through a 1×2 splitter to two reference sensors R1, R2 and their detectors $D_1$, $D_2$. The modulated light that is reflected from the sensor S is transmitted back to a third detector $D_3$. The two reference interferometers can be designed with gaps of 6 and 18 um, for example.

The oscillator for gap $G_R$ changes at a set rate, i.e. 1000 Hz and travels through a range of motion of approximately 20 µm. The ultimate range of motion is approximately 5 to 25 µm for the scanned gap, which consists of a moving mirror that maintains parallelism with the reflective end of an optical fiber. The range of motion and the rate of oscillation may be modified for specific applications. The trade off with increased bandwidth is increased noise and reduced dynamic measurement range of the Fabry-Perot sensor gap to be measured.

The detectors $D_1$, $D_2$, $D_3$ may be either silicon or InGaAs photodiodes. For short-range applications, i.e. up to 1000 meters, a quartz-halogen lamp provides the best performance. For long-range applications, i.e. 500 meters to 2500 meters the tungsten lamp provides somewhat better performance.

The inventive systems 10, 11, 12 can be easily multiplexed with several channels of optical data sharing a single oscillator and microprocessor, however, each channel requires its own set of reference interferometers and photodiodes.

Figure 11:
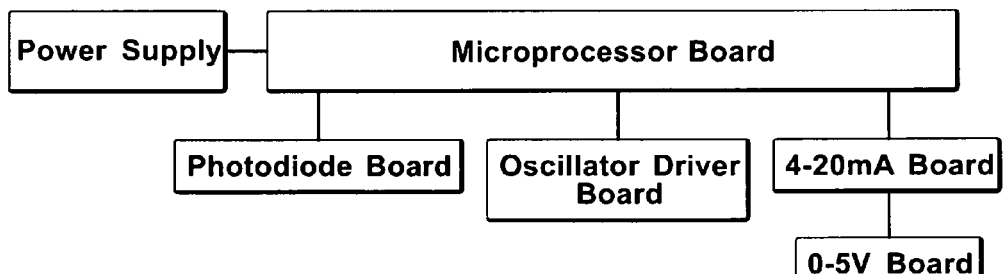
FIG. 11 shows one possible block diagram of the elements of the invention.

Finally, the system electronics are depicted FIG. 11. The power supply board converts 110 VAC to 12 VDC and 5 VDC and is used to power the microprocessor board. The photodiode board generates a voltage proportional to the amount of light that illuminates each photodiode. The output of the photodiode board is the input for the microprocessor board. The microprocessor board digitizes the signal from the photodiode board and determines the sensor gap. The microprocessor also provides a signal to the oscillator driver and provides a digital output, i.e. RS-232, to the control system. The final output of the system can be an analog signal, e.g. 0-5V or 4-20 mA.

We claim:

1. A system for quantitatively measuring a gap, the system comprising:
   a first source of light;
   a first sensor spanning a first gap distance, said first sensor having a first Fabry-Perot interferometer which modulates light received from the source;
   a second sensor spanning a second gap distance, said second sensor having means for controllably altering the second gap distance which is a second Fabry-Perot interferometer that optically cross-correlates the modulated light;

a third sensor spanning a third gap distance, the third sensor having a third Fabry-Perot interferometer with a static third gap distance;

means for verifying the second gap distance;

a correlation burst signal detector;

means for conveying light between the first source of light, the first sensor, the second sensor and the correlation burst signal detector; and means for comparing a first correlation burst signal received from the first sensor with a second correlation burst signal received from the third sensor, the first and second correlation burst signals produced by the second sensor that optically cross-correlates modulated light, to quantitatively determine the first gap distance.

2. The system according to claim 1, wherein the means for controllably altering the second gap distance includes a PZT element.

3. The system according to claim 2, wherein the PZT element is a PZT bimorph.

4. The system according to claim 2, wherein the means for verifying the second gap distance is selected from the group consisting of: an optical displacement probe, a sensor having a capacitive bridge, a sensor having a resistive bridge and a sensor having a linear variable differential transformer.

5. The system according to claim 1, further comprising a second source of light provided to the second sensor but not to the first sensor, to generate the second correlation burst signal.

6. The system according to claim 5, wherein the second source of light includes at least one selected from the group consisting of: a VCSEL, an ELED and HeNe laser.

7. The system according to claim 5, wherein the means for verifying the second gap distance includes filter means for distinguishing the first and second sources of light, said filter means interposed between the correlation burst signal detector and the first and second sources of light, the third sensor receiving light from the filter means.

8. The system according to claim 7, wherein means for comparing correlation burst signals is time-based.

9. The system according to claim 7, wherein the second source of light includes a VCSEL and an ELED and the first source of light includes a tungsten lamp.

10. The system according to claim 7, wherein the correlation burst signal detector comprises first, second and third detectors elements.

11. The system according to claim 5, wherein the means for verifying the second gap distance includes filter means associated with the correlation burst signal detector for distinguishing the first and second sources of light.

12. The system according to claim 11, wherein the second source of light includes an HeNe laser.

13. The system according to claim 11, wherein means for comparing correlation burst signals is time-based.

14. The system according to claim 11, wherein the correlation burst signal detector comprises first and second detectors elements.

15. The system according to claim 1, further comprising:
a fourth sensor spanning a fourth gap distance, the fourth sensor having a fourth Fabry-Perot interferometer with a static fourth gap distance;
wherein means for comparing correlation burst signals is time-based and wherein the means for verifying the second gap distance comprises the third sensor and the fourth sensor, the third and fourth gap distances representing lower and upper limits of measurement for the system.

16. The system according to claim 15, further comprising a variable optical attenuator interposed between the third and fourth sensors and the first source of light.

17. The system according to claim 16, wherein the correlation burst signal detector comprises at least three detector elements and wherein each detector element is associated with a differing combination of system elements.

18. A method for quantitatively measuring an unknown variable gap, the method comprising:
providing a source of light providing light to a first sensor having a Fabry-Perot interferometer spanning an unknown gap and to a second sensor with a controllably variable interferometric gap, said second and first sensors arranged in a series, so that the light is modulated and cross-correlated;
generating a variable detector signal from the modulated and cross-correlated light;
further providing the modulated and cross-correlated light separately to a first reference interferometer spanning a static and known first gap and a second reference interferometer spanning a static and known second gap;
generating a lower limit reference signal from the light provided to the first reference interferometer;
generating an upper limit reference signal from the light provided to the second reference interferometer; and
comparing the variable detector signal, the lower limit reference signal and the upper limit reference signal to compute the distance of the unknown variable gap.

19. The method according to claim 18, wherein the comparing of the variable detector signal, the lower limit reference signal and the upper limit reference signal is performed on a time-oriented basis.

20. A method for quantitatively measuring an unknown variable gap, the method comprising:
providing a first source of light providing light to a first sensor having a Fabry-Perot interferometer spanning an unknown gap and to a second sensor with a controllably variable interferometric gap, said second and first sensors arranged in a series, so that the light is modulated and cross-correlated;
generating a variable detector signal from the modulated and cross-correlated light;
providing a second source of light to the second sensor;
filtering light contacting the second sensor to distinguish between the first and second sources of light;
generating a first reference signal from the filtered light associated with the first source of light;
generating a second reference signal from the filtered light associated with the second source of light; and
comparing the variable detector signal, the first reference signal and the second reference signal to compute the distance of the unknown variable gap.

21. A system for quantitatively measuring a gap, the system comprising:
a first source of light;
a first Fabry-Perot interferometer having a variable first gap distance which modulates light received from the first source of light;
a gap adjusting element;
a second Fabry-Perot interferometer having a variable second gap distance and coupled to the gap adjusting element to adjust the second gap distance;
a third Fabry-Perot interferometer having a static third gap distance;

a correlation burst signal detector system receiving a first correlation burst signal representative of the first gap distance and a second correlation burst signal representative of the third gap distance, the correlation burst signal detector system further comprises:

a first burst signal detector receiving the first burst signal; and a second burst signal detector receiving the second burst signal;

a second source of light; and a first filter for filtering out at least a portion of the first source of light.

22. The system according to claim 21, wherein the gap adjusting element is a PZT element.

23. The system according to claim 21, wherein the second source of light includes at least one selected from the group consisting of: a VCSEL, an ELED and a HeNe laser.

24. The system according to claim 1, further comprising:
a third source of light; and
a second filter for filtering out at least a portion of the first source of light and the second source of light;
where the correlation burst signal detector system further comprises a third burst signal detector receiving a third burst signal representative of the wavelength of the third source of light.

25. The system according to claim 21, further comprising a fourth Fabry-Perot interferometer having a static fourth gap distance;
wherein the correlation burst signal detector system further receives a third correlation burst signal representative of the fourth gap distance.

26. The system according to claim 21, further comprising:
a fourth Fabry-Perot interferometer having a static fourth distance;
wherein the correlation burst signal detector system further comprises:
a first burst signal detector receiving the first burst signal;
a second burst signal detector receiving the second burst signal;
a third burst signal detector receiving a third burst signal representative of the fourth gap distance.

27. A system for quantitatively measuring a gap, the system comprising:
a first source of light;
a first Fabry-Perot interferometer having a variable first gap distance which modulates light received from the first source of light;
a second source of light;
a gap adjusting element;
a second Fabry-Perot interferometer having a variable second gap distance and coupled to the gap adjusting element to adjust the second gap distance, the second Fabry-Perot interferometer cross-correlating light from the first source of light and modulating light from the second source of light;
a first correlation burst signal detector receiving a first correlation burst signal representative of the first gap distance; and
a second correlation burst signal representative of the wavelength of the second source of light.

28. The system according to claim 27 wherein the gap adjusting element is a PZT element.

29. The system according to claim 27 wherein the second source of light is a HeNe laser.

* * * * *

UNITED STATES PATENT AND TRADEMARK OFFICE
CERTIFICATE OF CORRECTION

| | |
|---|---|
| PATENT NO. | : 7,355,684 B2 |
| APPLICATION NO. | : 11/106750 |
| DATED | : April 8, 2008 |
| INVENTOR(S) | : Larry A. Jeffers, John W. Berthold and Richard L. Lopushansky |

It is certified that error appears in the above-identified patent and that said Letters Patent is hereby corrected as shown below:

Column 10, line 55, delete "GR gap" and insert --D1, D2, and D3 trace out the correlation pattern that results from one cycle of oscillation of the GR gap.--

Column 11, line 15, delete "co" and insert --ω--

Column 11, line 16, delete "cox" and insert --cos--

Column 15, line 60, delete "detectors" and insert --detector--

Signed and Sealed this

Tenth Day of February, 2009

JOHN DOLL
*Acting Director of the United States Patent and Trademark Office*